United States Patent
Muchherla et al.

(10) Patent No.: US 12,430,243 B2
(45) Date of Patent: Sep. 30, 2025

(54) USING A COMMON POOL OF BLOCKS FOR USER DATA AND A SYSTEM DATA STRUCTURE

(71) Applicant: Micron Technology, Inc., Boise, ID (US)

(72) Inventors: Kishore Kumar Muchherla, San Jose, CA (US); Kulachet Tanpairoj, Santa Clara, CA (US); Peter Feeley, Boise, ID (US); Sampath K. Ratnam, San Jose, CA (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/070,844

(22) Filed: Nov. 29, 2022

(65) Prior Publication Data

US 2023/0088790 A1     Mar. 23, 2023

Related U.S. Application Data

(63) Continuation of application No. 17/211,544, filed on Mar. 24, 2021, now Pat. No. 11,520,699, which is a continuation of application No. 16/237,250, filed on Dec. 31, 2018, now Pat. No. 10,977,174.

(51) Int. Cl.
*G06F 12/00* (2006.01)
*G06F 3/06* (2006.01)
*G06F 12/02* (2006.01)

(52) U.S. Cl.
CPC .......... *G06F 12/0253* (2013.01); *G06F 3/061* (2013.01); *G06F 3/0631* (2013.01); *G06F 3/064* (2013.01); *G06F 3/0679* (2013.01); *G06F 2212/1016* (2013.01); *G06F 2212/70* (2013.01); *G06F 2212/7202* (2013.01); *G06F 2212/7205* (2013.01)

(58) Field of Classification Search
CPC ......... G06F 3/061; G06F 3/0631; G06F 3/064
USPC ........................................................ 711/103
See application file for complete search history.

(56) References Cited

U.S. PATENT DOCUMENTS

| | | | |
|---|---|---|---|
| 10,048,885 B1 | 8/2018 | Bono | |
| 2006/0143217 A1 | 6/2006 | Stanev | |
| 2007/0002612 A1* | 1/2007 | Chang | G06F 3/0679 365/185.01 |
| 2009/0168525 A1 | 7/2009 | Olbrich et al. | |
| 2011/0185129 A1 | 7/2011 | Landau et al. | |

(Continued)

FOREIGN PATENT DOCUMENTS

| | | |
|---|---|---|
| CN | 101213510 A | 7/2008 |
| CN | 107526533 A | 12/2017 |
| CN | 108733309 A | 11/2018 |

*Primary Examiner* — Mohamed M Gebril
(74) *Attorney, Agent, or Firm* — Lowenstein Sandler LLP

(57) ABSTRACT

A method includes identifying, by a processing device, a common pool of blocks comprising a first plurality of blocks allocated to system data and a second plurality of blocks allocated to user data; determining whether user data has been written to the second plurality of blocks within a threshold period of time; and responsive to determining that the user data has not been written to the second plurality of blocks within the threshold period of time, allocating a block from the second plurality of blocks to the first plurality of blocks.

20 Claims, 5 Drawing Sheets

(56) References Cited

U.S. PATENT DOCUMENTS

| | | | |
|---|---|---|---|
| 2013/0073818 A1* | 3/2013 | Wakerly | G06Q 20/352 |
| | | | 711/E12.002 |
| 2014/0075099 A1* | 3/2014 | Ooneda | G06F 11/1008 |
| | | | 714/773 |
| 2016/0157263 A1* | 6/2016 | Lee | H04W 4/70 |
| | | | 455/450 |
| 2016/0179386 A1* | 6/2016 | Zhang | G06F 3/061 |
| | | | 711/103 |
| 2016/0299722 A1* | 10/2016 | Seo | G06F 3/0665 |
| 2018/0365079 A1* | 12/2018 | Koch | G06F 9/5083 |
| 2019/0079861 A1* | 3/2019 | Amaki | G11C 29/42 |
| 2020/0042455 A1* | 2/2020 | Cho | G06F 3/0604 |
| 2020/0210331 A1* | 7/2020 | Muchherla | G06F 3/064 |

* cited by examiner

USING A COMMON POOL OF BLOCKS FOR USER DATA AND A SYSTEM DATA STRUCTURE

RELATED APPLICATIONS

The present application is a continuation of application Ser. No. 17/211,544, filed Mar. 24, 2021, entitled "Using a Common Pool of Blocks for User Data and a System Data Structure", which is a continuation of application Ser. No. 16/237,250, filed Dec. 31, 2018, entitled "Using a Common Pool of Blocks for User Data and a System Data Structure," both of which are incorporated by reference herein.

TECHNICAL FIELD

Embodiments of the disclosure relate generally to memory sub-systems, and more specifically, relate to using a common pool of blocks for user data and a system data structure.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
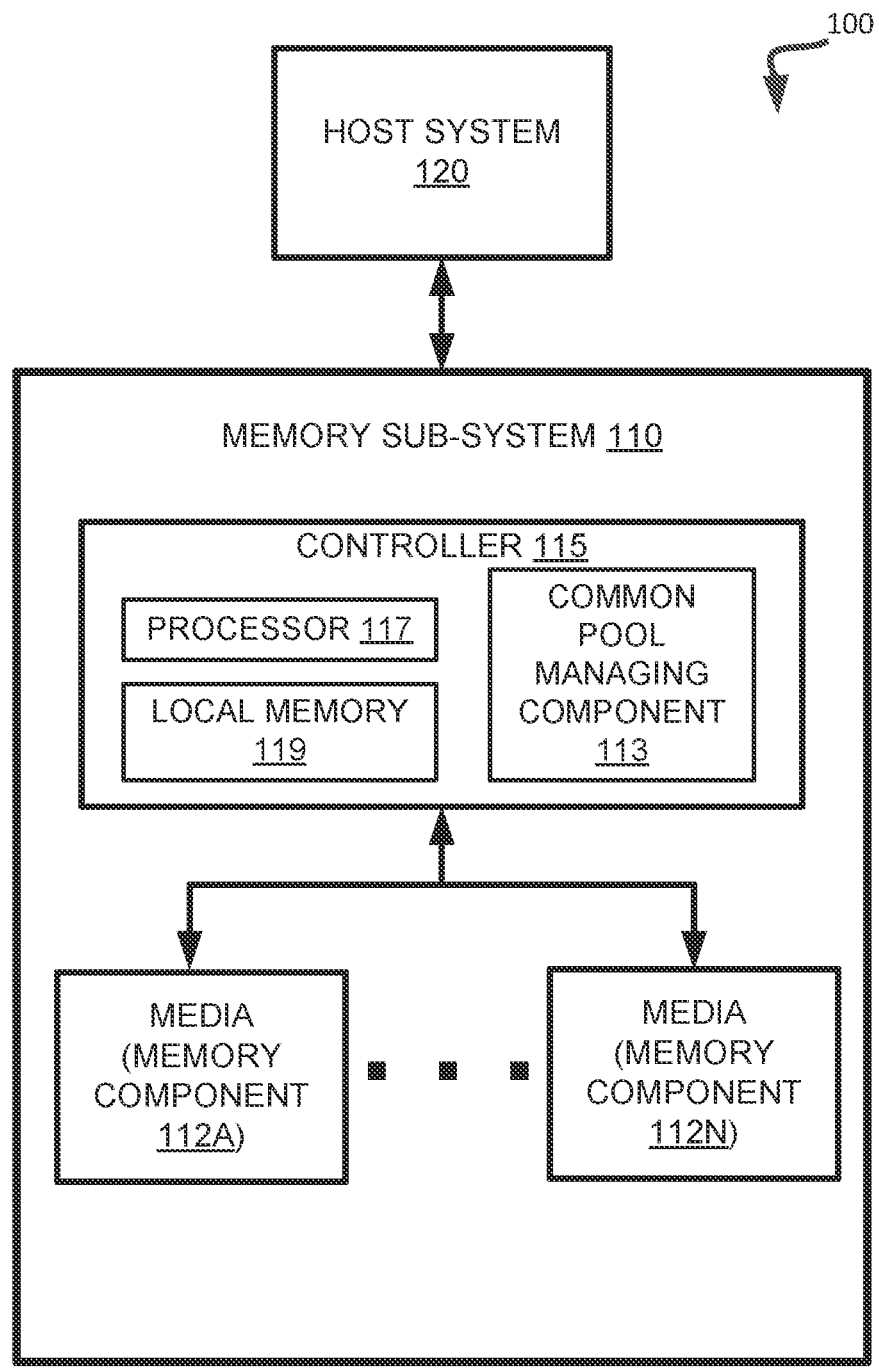
FIG. 1 illustrates an example computing environment that includes a memory sub-system in accordance with some embodiments of the present disclosure.

Aspects of the present disclosure are directed to using a common pool of blocks for user data and a system data structure. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A memory component can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. The SLC portion can include reserved blocks for different purposes. For example, a portion of blocks can be reserved for a system data structure (e.g., a table of logical to physical ("L2P") address mappings) and another portion of blocks can be reserved for user data. Until the reserved blocks are allocated for their designated purpose, the blocks can be unused and not contain valid data. In conventional memory sub-systems, once allocated, each of the portions are not used for different purposes. For example, in a conventional memory sub-system, a block allocated for the system table is not later reallocated for user data.

In some host systems, the performance of applications executing on the host system can highly depend on the speed at which data can be accessed in a memory sub-system. To accelerate data access, conventional memory sub-systems use spatial and temporal locality of memory access patterns to optimize performance. These memory sub-systems can use high-performance, lower-capacity media, referred to as caches, to store data that is accessed frequently (temporal locality) or data located in a memory region that has recently been accessed (spatial locality). The caches can be implemented using the portion of blocks of the memory component (e.g., SLC) reserved for the user data.

During execution of the applications on the host system, the memory sub-system can add, remove, or modify the blocks allocated for the system data structure. In some instances, the number of blocks allocated for the system data structure can reach a limit and a garbage collection operation can be used to free one of the blocks. Garbage collection can refer to rewriting the data of a block to another block. For example, the data of a block having one type of memory (e.g., SLC) can be rewritten to a block having the same or different memory type (e.g., multi-level cell (MLC), triple-level cell (TLC), quad-level cell (QLC)).

Performing the garbage collection operation can hinder the performance of the memory sub-system and lower the endurance of the memory components to which the data is being rewritten. For example, rewriting the data to a memory component having a type of memory cell (e.g., MLC) that requires precise voltage application to program the data can be slower than writing the data to a memory component having a type of memory cell (e.g., SLC) that does not require precise voltage application. Further, garbage collection also involves additional writes by rewriting the data to another location of memory. Performing additional writes can lower bandwidth of the memory sub-system by consuming resources (e.g., processing and/or memory). Also, the more writes that are performed (e.g., write amplification) on a memory component, the faster the degradation of the memory component.

Thus, in some conventional memory sub-systems, additional blocks are allocated to the system data structure. Adding additional blocks can reduce the impact experienced from garbage collection operations because the memory sub-system can use the extra blocks allocated for the system data structure instead of performing the garbage collection operation more frequently to free a used block (e.g., a block that is allocated and storing valid data). However, this over-provisioning of blocks for the system data structure can consume an undesirable number of blocks that could potentially be used for other purposes.

For example, when a host system is operating sequential workloads, the number of blocks used for the system table is low to satisfy a target performance. When the host system operates random workloads, the number of blocks used for the system table is high to satisfy the target performance. In conventional systems, the number of blocks allocated to the system table is configured to handle the random workload to satisfy the target performance without consideration for when the workload changes between random and sequential. While the host system is operating sequential workloads, a surplus of the blocks allocated for the system table can go unused in conventional systems.

Aspects of the present disclosure address the above and other deficiencies by using a common pool of blocks for user data and a system data structure (e.g., a table of L2P mappings). The number of blocks allocated for the user data and the system data structure can change dynamically during use to maximize performance, endurance, and the over-provisioning of blocks. Initially, the common pool can be created with a set of blocks allocated to the system data structure and another set of blocks allocated to user data. The common pool can also initially include unused blocks that are not allocated to either the system data structure or user data until certain conditions described below occur. The blocks of the common pool can be reserved for the common pool and can be SLC memory type.

There can be several scenarios when blocks in the different sets of blocks are reallocated for a different purpose. For example, blocks in the set of blocks associated with the user data can be reallocated to the set of blocks associated with the system data structure when a garbage collection performance condition is not satisfied or when a steady state condition is satisfied. In some embodiments, the steady state condition is satisfied when user data has not been written to the blocks allocated for the user data in more than a threshold amount of time. Also, blocks of the set of blocks associated with the system data structure can be reallocated to the set of blocks associated with the user data when a determination is made that either the blocks of the set of blocks associated with the system data structure are not being used or the number of blocks of the set of blocks associated with the system data structure used to meet the target performance satisfies a threshold (e.g., a minimum number of blocks). Blocks of the set of blocks associated with the system data structure can also be reallocated to the set of blocks associated with the user data when requests are received to write user data to the cache implemented by the set of blocks in the common pool allocated for the user data.

In some embodiments, a request can be received to add content to a system data structure. The content can be an L2P mapping. A determination can be made as to whether a garbage collection operation associated with the set of blocks of the common pool allocated to the system data structure satisfies a garbage collection performance condition. The garbage collection performance condition can be related to an amount of effort required to rewrite the data stored at a block allocated to the system data structure to another block. To make the determination, the amount of valid data stored at each of the blocks allocated to the system data structure can be identified. Valid data can refer to data successfully written to a data block and the data has not been erased, indicated to be erased, updated, or re-programmed by a host system. If the amount of valid data is below a threshold amount, then the garbage collection performance condition can be satisfied because the garbage collection performance condition can be performed with an amount of effort that does not hinder performance. If the amount of valid data is above the threshold amount, then the garbage collection performance condition is not satisfied because the garbage collection performance condition cannot be performed without hindering performance.

Responsive to determining that the garbage collection operation satisfies the garbage collection performance condition, a block from the common pool can be allocated to the set of blocks for the system data structure. In some embodiments, the block that is allocated from the common pool can be an unused block (e.g., not allocated and/or storing valid data) in the common pool. In some embodiments, when every block in the common pool is either allocated to the system data structure or user data, the block that is selected from the common pool can be a block that is already allocated to the system data structure. For example, a block that includes the least valid data for the system data structure can be selected, garbage collected, and reallocated to the set of blocks for the system data structure to store the content. In this way, the set of blocks allocated to the system data structure can be self-sustaining and no blocks in the set of blocks allocated to user data are reallocated to the system table. The number of blocks in the set of blocks allocated to system table can be less than an upper limit when the garbage collection performance condition is satisfied. Further, the remaining unused blocks in the common pool can be allocated to the set of blocks allocated to user data when the garbage collection performance condition is satisfied for the set of blocks allocated to the system data structure. In such an embodiment, the number of blocks allocated to user data can be at a maximum amount.

If an unused block in the common pool is allocated to the set of blocks allocated to the system data structure, the garbage collection operation can be performed on another block of the set of blocks allocated to the system data structure. The content can be stored in the block that is allocated to the set of blocks allocated to the system data structure. The block that is garbage collected can be the block that includes a least amount of valid data of the blocks allocated to the system data structure. In some embodiments, the block that is garbage collected can be allocated from the set of blocks of the common pool allocated to the system data structure to the set of blocks of the common pool allocated to user data. In some embodiments, the block that is garbage collected can be returned to the common pool as an unused block. The total number of blocks allocated for the system data structure can remain the same by allocating one block and garbage collecting another block.

Responsive to determining that the garbage collection operation does not satisfy the garbage collection performance condition, a determination can be made as to whether a threshold condition related to a number of the set of blocks allocated to the system data structure is satisfied. If the threshold condition is satisfied (e.g., less than an upper limit number of blocks of the common pool are allocated to the system data structure), then a block from the common pool can be allocated to the set of blocks for the system data structure without performing the garbage collection operation on the set of blocks allocated to the system data structure. In some embodiments, if the threshold condition is satisfied and every block in the common pool are either allocated to the system data structure or user data, a block from the second set of blocks allocated to the user data can be allocated to the set of blocks for the system data structure without performing the garbage collection operation on the set of blocks allocated to the system data structure. If the threshold condition is not satisfied (e.g., an upper limit on the number of blocks of the common pool allocated to the system data structure is reached), the garbage collection operation can be performed on a block of the set of blocks of the common pool allocated to the system data structure. The block can remain allocated for the set of blocks of the common pool for the system data structure. The content can be stored in the block allocated for the set of blocks allocated for the system data structure.

In some instances, referred to as steady state conditions, a host system can continuously write data to a backing store of the memory sub-system having a memory type (e.g., MLC, TLC, QLC) different than the memory component providing the common pool of blocks allocated for the user data and the system data structure. The backing store can be included in the same or different memory component than the memory component providing the common pool of blocks. The steady state condition can be detected by determining whether user data has been written to the set of blocks of the common pool of blocks allocated to user data within a threshold amount of time. If data has not been written to the set of blocks of the common pool of blocks allocated to user data within the threshold amount of time, one or more blocks from the set of blocks of the common pool of blocks allocated to user data can be allocated to the set of blocks of the common pool of blocks for the system data structure. The content associated with the system data structure can be stored in the allocated block. In such an embodiment, the number of blocks in the set of blocks allocated to the system data structure can exceed the upper limit number and the number of blocks in the set of blocks allocated to user data can be at a minimum value (e.g., zero).

In some embodiments, after operating under steady state conditions for a period of time, the host system can request to write user data to the memory sub-system again. In such an instance, one or more blocks in the set of blocks allocated to the system data structure can be selected (e.g., based on least amount of valid data) and garbage collection operations can be performed on the selected blocks to reduce the number of the set of blocks allocated to the system data structure to the upper limit number. The blocks on which the garbage collection operation are performed can be allocated to the set of blocks allocated to user data.

Advantages of the present disclosure include, but are not limited to, an improved performance of the memory sub-system and/or a host system as the performance of garbage collection operations is limited to certain scenarios. For example, when allocating a block in a set of blocks of the common pool of blocks for the system data structure, a determination can be made as to whether a garbage collection operation associated with the set of blocks for the common pool allocated to the system data structure satisfies a garbage collection performance condition. Limiting the performance of the garbage collection operation to certain scenarios can improve the endurance of the memory component. Further, over-provisioning of blocks can be enhanced because blocks in the common pool can be dynamically allocated based on the garbage collection performance condition being satisfied and/or memory usage patterns being identified (e.g., steady state conditions and/or whether certain blocks are not being used). Blocks that are allocated either for the system data structure or the user data in the common pool can be reallocated for the other purpose (e.g., system data structure or the user data) if the blocks are not being used. As a result, fewer memory resources of the memory sub-system are wasted.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a common pool managing component 113 that can be used to manage the allocation of blocks in a common pool for user data and a system data structure. In some embodiments, the controller 115 includes at least a portion of the common pool managing component 113. For example, the controller 115 can include a processor 117 (processing device) configured to execute instructions stored in local memory 119 for performing the operations described herein. In some embodiments, the common pool managing component 113 is part of the host system 110, an application, or an operating system.

The common pool managing component 113 can manage the allocation of blocks in a common pool of blocks for user data and a system data structure (e.g., a table of L2P mappings). For example, the common pool managing component 113 can determine when blocks allocated for either the user data or the system data structure are not being utilized and can reallocate the blocks for the other purpose (e.g., user data or the system data structure). Further, the common pool managing component 113 can take the effort of performing a garbage collection operation into account when allocating blocks between a first set of blocks of the common pool allocated to the system data structure and a second set of blocks of the common pool allocated to the user data. For example, the common pool managing component 113 can track the size of valid data stored in each of the first set of blocks of the common pool allocated to the system data structure and determine whether a garbage collection performance condition is satisfied. If the garbage collection performance condition is satisfied, common pool managing component 113 allocates a block from the common pool to the first set of blocks allocated to the system data structure. The block that is allocated to the system data structure can either be an unused bock in the common pool or a block that was previously allocated to the system data structure. The common pool managing component 113 also performs the garbage collection operation on a block of the first set of blocks allocated to the system data structure. The block on which the garbage collection operation is performed can be allocated to the set of blocks allocated to user data or the set of blocks allocated to the system data structure or the block can be returned to the common pool. In some embodiments, the common pool managing component 113 also determines when user data has not been written to the second set of blocks of the common pool allocated to the user data in a threshold amount of time and allocates one or more of the blocks from the second set of blocks allocated to the user data to the first set of blocks allocated to the system data structure. Further details with regards to the operations of the common pool managing component 113 are described below.

Figure 2:
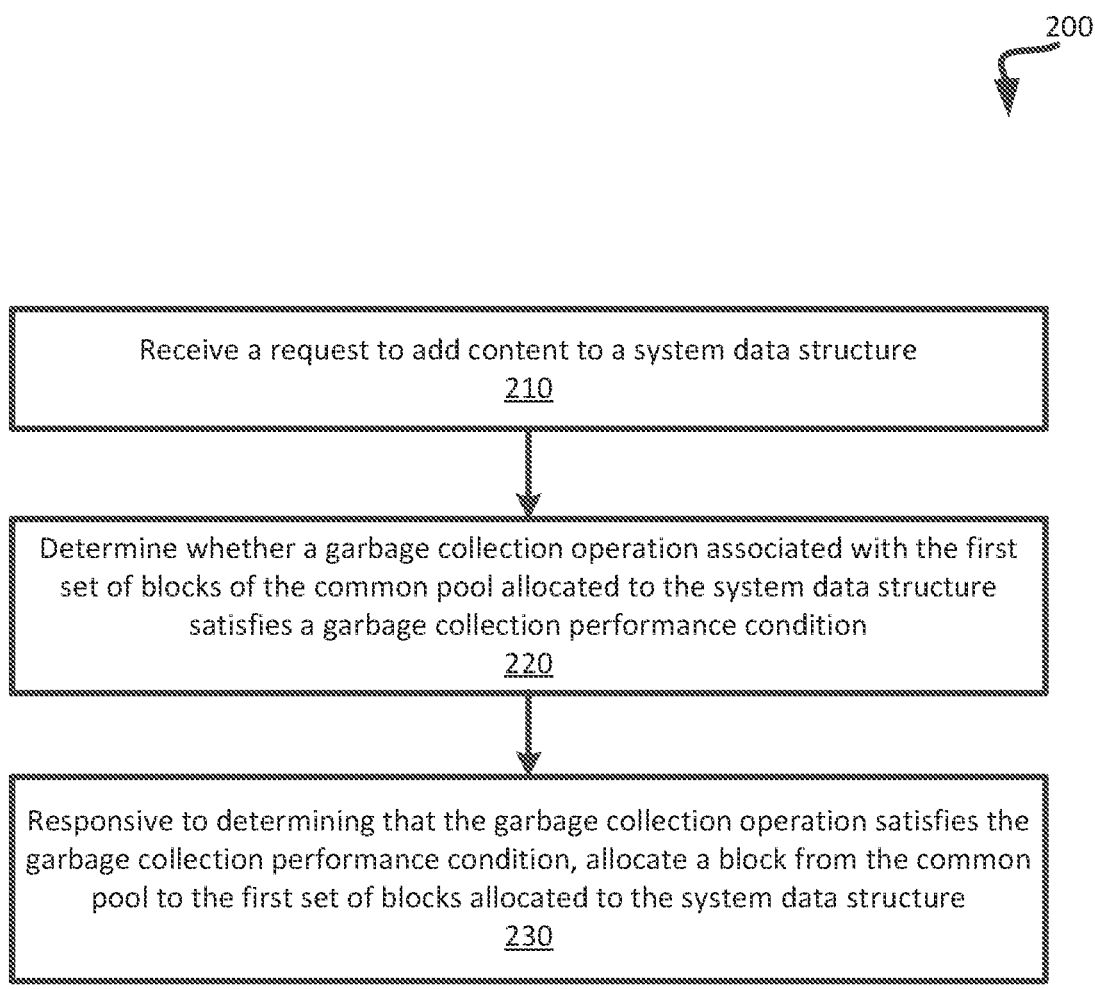
FIG. 2 is a flow diagram of an example method using a common pool of blocks for user data and a system table in accordance with some embodiments of the present disclosure.

FIG. 2 is a flow diagram of an example method 200 using a common pool of blocks for user data and a system data structure in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the common pool managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives a request to add content to a system data structure (e.g., table). The request can be received from the host system in response to the L2P address mappings being created and/or updated. The content includes logical to physical (L2P) address mappings. The L2P mapping can map a logical block address to a physical block address of a memory sub-system. For example, the content to be added can be a new mapping between a logical block address and a physical block address. The content can be received as applications are executing on the host system and reading data from and writing data to the one or more memory components. Further, the content can be received when data is moved between physical locations on the one or more memory components. A common pool of blocks can be allocated for user data and the system data structure. A first set of blocks of the common pool are allocated to the system data structure and a second set of blocks of the common pool of blocks are allocated to user data. Reserved SLC blocks in the memory component can be used for the common pool of blocks. There can also be a third set of unused blocks reserved in the common pool of blocks that can be allocated to the first set of blocks allocated to the system data structure or the second set of blocks allocated to user data during operation of a memory component.

At operation 220, the processing device determines whether a garbage collection operation associated with the first set of blocks allocated to the system data structure satisfies a garbage collection performance condition. The garbage collection performance condition can be associated with the amount of effort used to perform the garbage collection operation. The effort may refer to the amount of time and/or resources (e.g., processing and/or memory) used to perform the garbage collection operation. The effort associated with performing the garbage collection operation can be determined based on the amount of valid data stored in the first set of blocks of the common pool allocated to the system table. If the amount of valid data stored in a block satisfies (e.g., is below) a threshold amount of valid data, the garbage collection performance condition is satisfied because the effort to perform the garbage collection operation is within a threshold limit. If the amount of valid data stored in the block does not satisfy (e.g., is equal to or greater than) the threshold amount of valid data, the garbage collection performance condition is not satisfied because the effort to perform the garbage collection operation is outside the threshold limit. The determination can be made by tracking a size of the valid data stored in each of the first set of blocks allocated to the system data structure on which the garbage collection operation is to be potentially performed. The processing device can evaluate the effort of performing the garbage collection operation for each of the first set of blocks allocated to the system data structure based on the amount of valid data stored at each of the first set of blocks. If there are more than one block that are determined to satisfy the garbage collection performance condition due to the effort to perform the garbage collection operation being within the threshold limit, the processing device can select the block storing the least amount of valid data for the garbage collection operation.

At operation 230, responsive to determining that the garbage collection operation satisfies the garbage collection performance condition, the processing device allocates a block from the common pool to the first set of blocks allocated to the system data structure. The block that is selected can be an unused block in the common pool. In some embodiments, if every block in the common pool are allocated to the first set or the second set of blocks, then a block from the first set of blocks allocated to the system data structure can be selected for garbage collection and to store the content. The content associated with the system data structure can be stored in the block allocated to the first set of blocks for the system data structure.

Further, responsive to determining that the garbage collection operation satisfies the garbage collection performance condition, the processing device can perform the garbage collection operation on a block of the first set of blocks allocated to the system data structure. The block on which the garbage collection operation is performed can include a least amount of valid data relative to the other blocks in the first set blocks allocated to the system data structure. Performing the garbage collection operation can include writing the data stored at the block to another block (e.g., in the same or different memory component) or erasing the data. In some embodiments, the processing device can allocate the block that is garbage collected back to the first set of blocks allocated for the system data structure to store the content. This scenario can occur when every block in the common pool are allocated to the first set or second set of blocks (e.g., there are no unused blocks available). In some embodiments, the processing device can allocate the block that is garbage collected to the second set of blocks allocated to the user data. In some embodiments, the processing device can return the block that is garbage collected to the common pool as an unused block.

In some embodiments, responsive to determining that the garbage collection operation does not satisfy the garbage collection performance condition, the processing device determines whether a threshold condition related to a number of the first set of blocks allocated to the system data structure is satisfied. For example, the garbage collection performance condition cannot be satisfied when every block allocated to the system data structure is storing more than a threshold amount of valid data. The threshold condition related to the number of the first set of blocks allocated to the system data structure can be satisfied when the total number of the first set of blocks is less than a threshold value (e.g., upper limit number). Using the threshold condition related to the number of the first set of blocks allocated to the system data structure can bound the number of blocks allocated for the system data structure. A similar threshold condition can be used when allocating blocks for the second set of blocks of the common pool for the user data.

Responsive to determining that the threshold condition related to the number of the first set of blocks allocated to the system data structure is satisfied, the processing device can allocate the block from the common pool to the first set of blocks allocated to the system data structure without performing the garbage collection operation on the first set of blocks allocated to the system data structure. The processing device can continue allocating from the common pool to the first set of blocks allocated to the system data structure for subsequent requests until the upper limit number of blocks for the first set of blocks allocated to the system data structure is reached (e.g., the threshold condition related to the number of the first set of blocks allocated to the system data structure is not satisfied).

Responsive to determining that the threshold condition related to the number of the first set of blocks allocated to the system data structure is not satisfied (e.g., the upper limit number is reached), the processing device can perform the garbage collection operation on a block of the second set of blocks allocated to user data. The threshold condition related to the number of the first set of blocks allocated to the system data structure cannot be satisfied when the total number of the first set of blocks allocated to the system data structure is greater than or equal to a threshold value (e.g., upper limit number). The block on which the garbage collection operation is performed can include a least amount of valid data relative to the other blocks in the second set of blocks allocated to user dat. The content can be stored in the block of the first set of blocks allocated to the system data structure.

In some embodiments, the processing device determines which block to allocate in the common pool for the content associated with the system data structure by determining whether user data has been written to the second set of blocks of the common pool of blocks allocated to user data within a threshold amount of time (e.g., steady state condition). This determination can be made prior to determining whether the garbage collection operation associated with the first set of blocks of the common pool allocated to the system data structure satisfies the garbage collection performance condition. Responsive to determining that the user data has not been written to the second set of blocks of the common pool of blocks allocated to user data within the threshold amount of time, the processing device can allocate one or more blocks from the second set of blocks of the common pool of blocks allocated to user data to the first set of blocks of the common pool of blocks allocated for the system data structure. In some embodiments, a block that is not storing any valid user data or that is storing the least amount of valid user data can be allocated from the second set of blocks of the common pool of blocks allocated to user data to the first set of blocks of the common pool of blocks allocated for the system. In some embodiments, each of the blocks in the second set of blocks allocated to user data can be reallocated to the first set of blocks allocated to the system data structure during the steady state condition. Accordingly, blocks that are not being used for user data can be repurposed to be used for content associated with the system data structure. In such embodiments, the number of blocks in the first set of blocks allocated to the system data structure can exceed the upper limit number and the number of blocks in the second set of blocks allocated to user data can be at a minimum value.

After operating under the steady state condition for a period of time and the majority of blocks in the common pool are allocated to the first set of blocks allocated to the system data structure, the host system can request to write user data to the memory component again. As such, the processing device can select blocks of the first set of blocks allocated to the system data structure based on amount of valid data stored at the blocks on which to perform a garbage collection operation. The processing device can perform the garbage collection operation on the selected blocks to reduce the number of blocks allocated to the first set of blocks to the upper limit number. The blocks on which the garbage collection operations are performed can be allocated to the second set of blocks allocated for user data and can store the user data.

FIG. 3A-3E illustrate examples of using a common pool 300 of blocks for user data and a system data structure in accordance with some embodiments of the present disclosure. The common pool 300 can be represented by a linked list or any suitable data structure. As depicted, the common pool includes a first set of blocks allocated for the system data structure, represented as "L2P (value)" (e.g., "L2P 1" and "L2P 2" are allocated in FIG. 3A), a second set of blocks allocated for user data, represented as "Cache (value)" (e.g., "Cache 1", "Cache 2", "Cache 3", and "Cache 4" are allocated in FIG. 3A), and a third set of unused blocks that are reserved in the common pool. The blocks allocated in the common pool 300 for the user data can be used as a cache to provide faster access to data that is recently used and/or frequently used. A processing device executing the common pool managing component 113 can be used to manage allocation of the blocks for the user data and system data structure in the common pool 300.

The blocks of the common pool 300 can be allocated using reserved SLC blocks in a memory component. A portion of the reserved SLC blocks can be allocated to the first set of blocks for the system data structure up to an upper limit configured for the first set of blocks for the system data structure. Also, a portion of the reserved SLC blocks can be allocated to the second set of blocks for the user data up to an upper limit configured for the second set of blocks for the user data. For example, half of the reserved SLC blocks can be allocated to the first set of blocks and half of the reserved SLC blocks can be allocated to the second set of blocks.

In certain scenarios, the upper limits can be exceeded for the number of blocks allocated to the user data and/or the system data structure. One such scenario is when a steady state condition is detected (e.g., host system has not written user data to the second set of blocks allocated for the user data in the common pool in more than a threshold amount of time), and the processing device can allocate some or all of the second set of blocks allocated to the user data to the first set of blocks allocated to the system data structure because the blocks were not being used for user data during the steady state condition. Since the user data and system data structure share a total number of blocks in the common pool, allocating blocks more than the upper limit for one purpose (e.g., system data structure) can consume blocks allocated for the other purpose (e.g., user data). In some embodiments, there is a lower limit configured for each of the first set of blocks allocated to the system data structure and the second set of blocks allocated to the user data so that a minimum number of blocks remain allocated for the user data and the system data structure at any given time. In some embodiments, the lower limit can be zero value for the first set and/or the second set of blocks.

A request to add content associated with the system data structure can be received. The processing device can determine whether a garbage collection operation associated with the first set of blocks of the common pool 300 allocated to the system data structure satisfies a garbage collection performance condition. To make this determination, the processing device identifies the amount of valid data in each of the first set of blocks allocated for the system data structure. Block 302 storing "L2P 1" in the depicted example in FIG. 3A includes a least amount of valid data and the processing device can determine that the garbage collection performance condition is satisfied if the garbage collection operation is performed on the block 302.

Responsive to determining that the garbage collection operation satisfies the garbage collection performance condition, the processing device can allocate a block from the common pool 300 to the first set of blocks allocated to the system data structure. When the garbage collection performance condition is satisfied, the number of blocks allocated to the first set of blocks allocated to the system data structure can be limited to a minimal value. In such an embodiment, the remaining unused blocks in the common pool 300 can be allocated to the second set of blocks allocated for user data. Increasing the size of the cache by increasing the number of blocks in the second set of blocks allocated to user data can reduce the wear of the common pool blocks and improve performance of the memory sub-system.

Figure 3:
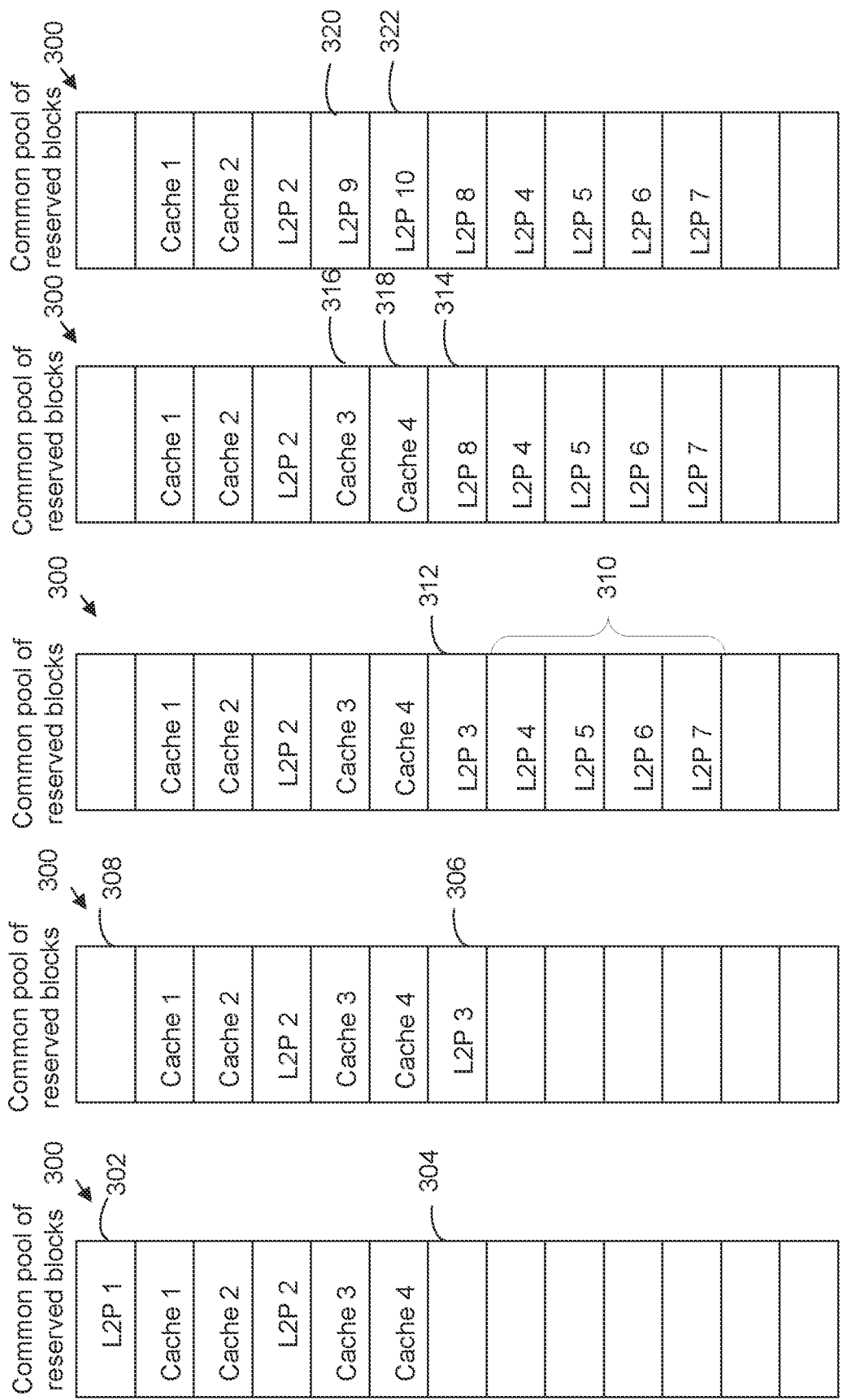
FIG. 3A-3E illustrate examples of using a common pool of blocks for user data and a system table in accordance with some embodiments of the present disclosure.

The processing device allocated unused block 304 from the common pool to the first set of blocks allocated to the system data structure. As depicted in FIG. 3B, a block 306 in the first set of blocks allocated to the system data structure is represented by block "L2P 3" in the common pool 300. Further, the processing device performs the garbage collection operation on the block "L2P 1" of the first set of blocks allocated to the system data structure. The processing device can return the garbage collected block 308 to the common pool 300. Accordingly, the number of blocks allocated to the first set of blocks for the system data structure did not change (remains at two) and remains at the minimal value. Also, the number of blocks allocated to the second set of blocks allocated to the user data did not change (remains at four).

In FIG. 3C, four additional requests to add content associated with the system data structure can be received. The processing device can determine whether the garbage collection operation associated with the first set of blocks of the common pool 300 allocated to the system data structure satisfies the garbage collection performance condition. In the depicted example in FIG. 3C, each of the first set of blocks allocated to the system data structure are storing more than a threshold amount of valid data that results in none of the first set of blocks satisfying the garbage collection performance condition.

In some embodiments, the processing device can also determine whether a threshold condition related to a number of the first set of blocks allocated to the system data structure is satisfied. The threshold condition can be satisfied when the number of the first set of blocks allocated to the system data structure is less than a threshold value. For explanatory purposes, the threshold value is six in the examples depicted in FIGS. 3A-3E. In FIG. 3B, the threshold condition is satisfied because two blocks ("L2P 2" and "L2P 3") are allocated for the system data structure in the common pool 300, which is less than the upper limit number of six. Accordingly, in FIG. 3C, the processing device allocates four blocks 310 ("L2P 4", "L2P 5", "L2P 6", "L2P 7") for the content associated with the system data structure in the common pool 300.

In some embodiments, when the garbage collection performance condition is satisfied, there may be a minimal number of blocks allocated to the first set of blocks allocated to the system data structure, and the remaining blocks not allocated to the first set of blocks allocated to the system data structure in the common pool 300 can be allocated to the second set of blocks allocated to user data. When the garbage collection performance condition is no longer satisfied, the processing device can allocate blocks to the first set of blocks allocated to the system data structure until the upper limit is reached. The blocks that are allocated to the first set of system data structure can be allocated from the second set of blocks allocated to user data.

In FIG. 3D, another request to add content associated with the system data structure can be received. The processing device can determine whether the garbage collection operation associated with the first set of blocks of the common pool 300 allocated to the system data structure satisfies the garbage collection performance condition. In the depicted example in FIG. 3D, each of the first set of blocks allocated to the system data structure are storing more than a threshold amount of valid data that results in none of the first set of blocks satisfying the garbage collection performance condition. The processing device can determine whether the threshold condition related to the number of the first set of blocks allocated to the system data structure is satisfied. In FIG. 3C, the threshold condition is not satisfied because six blocks ("L2P 2", "L2P 3", "L2P 4", "L2P 5", "L2P 6") are allocated for the system data structure in the common pool 300, which is equal to the upper limit of six.

Accordingly, the processing device selects a block for garbage collection from the first set of blocks allocated to the system data structure that includes a least amount of valid data relative to the other blocks in the first set of blocks allocated to the system data structure. The processing device selects block 312, represented by "L2P 3", in FIG. 3C as including the least amount of valid data. The processing device performs the garbage collection operation on content stored in block 312 in FIG. 3C and allocates block 314 in FIG. 3D to the first set of blocks allocated to the system data structure to store content associated with the request. The block 314 in the first set of blocks allocated to the system data structure is represented by "L2P 8" in FIG. 3D.

In FIG. 3E, the processing device detects a steady state condition. For example, the processing device determines that the host system has not written data to the second set of blocks in the common pool 300 allocated to the user data in more than a threshold amount of time. Accordingly, the processing device allocates a portion of the second set of blocks allocated to the user data to the first set of blocks allocated to the system data structure. The processing device selects blocks 316 and 318 in FIG. 3D to be reallocated from the second set of blocks allocated to the user data to the first set of blocks allocated to the system data structure. The processing device determines whether the number of blocks that remain allocated to the second set of blocks for the user data does not drop below the lower limit for the second set of blocks by reallocating blocks 316 and 318. In the depicted example in FIG. 3D, the lower limit for the second set of blocks for the user data is two, and thus, the lower limit is not violated because reallocating block 316 and 318 leaves two blocks (represented by "Cache 1" and "Cache 2") allocated to the second set of blocks for the user data. In some embodiments, the lower limit can be zero. If there is any valid data stored in blocks 318 and 316, the valid data can be garbage collected and rewritten to another block separate from the common pool 300. In FIG. 3E, the processing device allocates blocks 320 and 322 from the second set of blocks for the user data to the first set of blocks for the system data structure in the common pool 300. The blocks 320 and 322 in the first set of blocks allocated to the system data structure are represented by "L2P 9" and "L2P 10", respectively. As such, the upper limit for the first set of blocks allocated to the system data structure is exceeded to provide additional blocks to the system data structure, which can prevent the garbage collection operation from being performed on the first set of blocks allocated to the system data structure. The dynamic reallocation techniques described above can enhance performance, better utilize over-provisioning, and improve endurance of memory components.

In some embodiments, the host system can request to write user data to the memory component again. If there are no unused blocks available in the common pool 300, the processing device can select one or more of the blocks in the second set of blocks allocated to the system data structure to garbage collect, thereby reducing the number of blocks of the second set of blocks allocated for the system data structure to the upper limit. The blocks that are garbage collected can be allocated to the second set of blocks allocated to user data.

Figure 4:
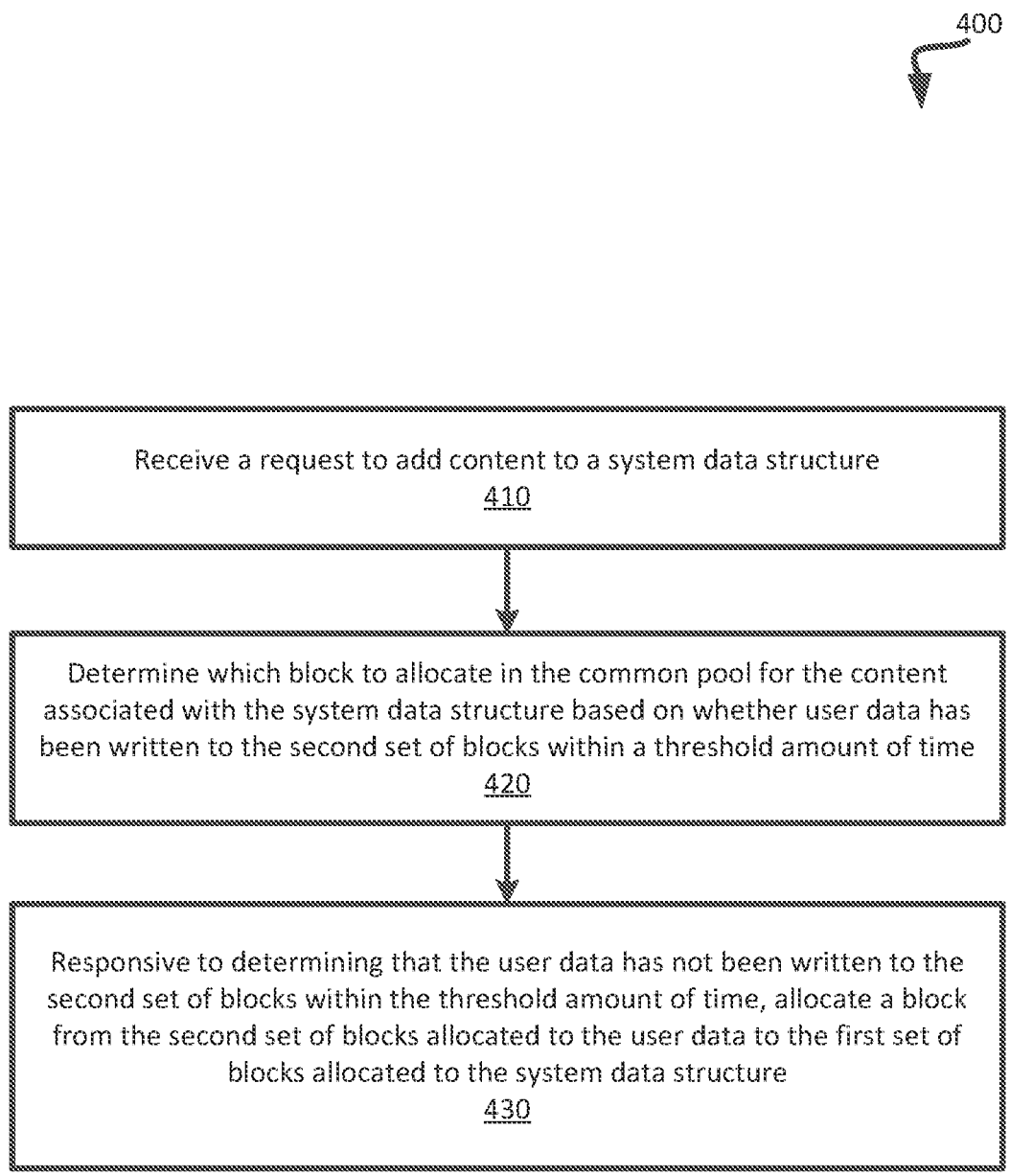
FIG. 4 is a flow diagram of another example method to use a common pool of blocks for user data and a system table in accordance with some embodiments of the present disclosure.

FIG. 4 is a flow diagram of another example method 400 to use a common pool of blocks for user data and a system data structure in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the common pool managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives a request to add content to a system data structure. The content can be a logical to physical (L2P) mapping. A first set of blocks of the common pool are allocated to the system data structure and a second set of blocks of the common pool of blocks are allocated to user data. There can be a third set of blocks of the common pool of blocks that are unused.

At operation 420, the processing device determines which block to allocate in the common pool for the content associated with the system data structure based on whether user data has been written to the second set of blocks within a threshold amount of time. The host system not writing user data to the second set of blocks of the common pool of blocks allocated to the user data within a threshold amount of time can indicate a steady state condition. During the steady state condition, the second set of blocks allocated to the user data can be underutilized. In some embodiments, the processing device can track a size of valid data stored in each of the second set of blocks allocated to the user data. Responsive to determining that the second set of blocks have not been written to within the threshold amount of time, the processing device can select one or more blocks that include no valid user data or the least amount of valid user data. In some embodiments, the processing device can select every block of the second set of blocks allocated to user data.

Accordingly, at operation 430, responsive to determining that the user data has not been written to the second set of blocks within the threshold amount of time, the processing device allocates one or more blocks from the second set of blocks allocated to the user data to the first set of blocks allocated to the system data structure. In some embodiments, responsive to determining that every block in the second set of blocks allocated to the user data includes valid data, the processing device can perform a garbage collection operation on a block of the second set of blocks allocated to the user data that includes the least valid data relative to other blocks of the second set of blocks allocated to the user data. The content associated with the request can be stored in the block allocated to the firsts set of blocks allocated to the system data structure.

In some embodiments, responsive to determining that the user data has been written to the second set of blocks of the common pool of blocks allocated to user data within the threshold amount of time, the processing device determines whether a garbage collection operation associated with the first set of blocks of the common pool allocated to the system data structure satisfies a garbage collection performance condition. Responsive to determining that the garbage collection operation satisfies the garbage collection performance condition, the processing device allocates a block from the common pool to the first set of blocks allocated to the system data structure. The processing device stores the content associated with the system data structure in the block allocated to the first set of blocks allocated to the system data structure. Further, the processing device performs the garbage collection operation on a block of the first set of blocks allocated to the system data structure. The block that is garbage collected can be returned to the common pool, allocated to the first set of blocks allocated to the system data structure, or allocated to the second set of blocks allocated to user data.

Figure 5:
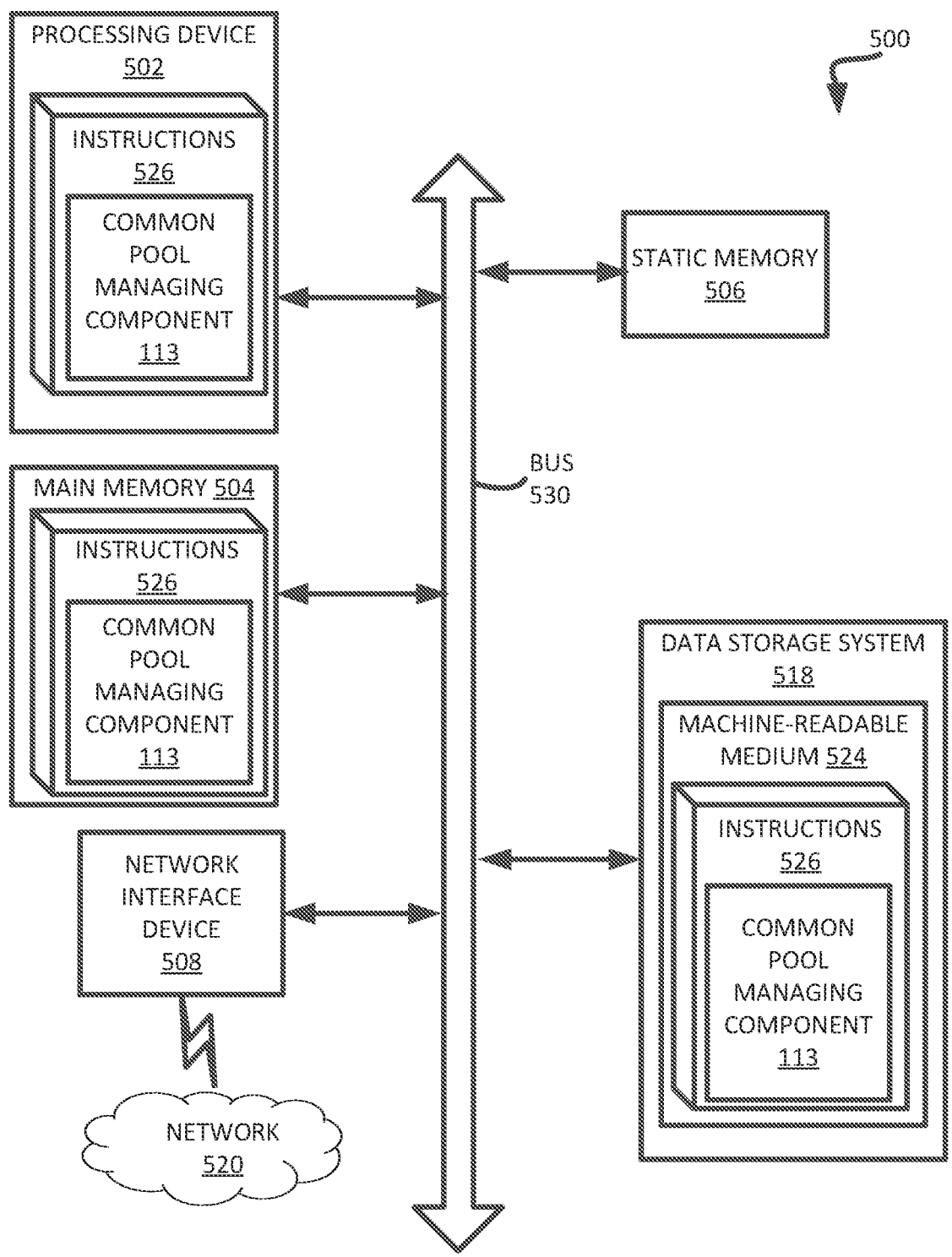
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the common pool managing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a common pool managing component (e.g., the common pool managing component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   identifying, by a processing device, a common pool of blocks of a memory device, the common pool of blocks comprising a first plurality of blocks allocated to system data and a second plurality of blocks allocated to user data;
   responsive to determining that the user data has not been written to the second plurality of blocks within a threshold period of time, allocating a block from the second plurality of blocks to the first plurality of blocks of the memory device, wherein the block is designated for the user data before the allocating and designated for the system data after the allocating; and
   responsive to identifying, among the first plurality of blocks, an unused block, reallocating the unused block from the first plurality of blocks to the second plurality of blocks, wherein the unused block is designated for the system data before the reallocating and designated for the user data after the reallocating.

2. The method of claim 1, further comprising:
determining whether a size of data of the first plurality of blocks satisfies a garbage collection performance condition.

3. The method of claim 2, wherein determining whether the size of data of the first plurality of blocks satisfies the garbage collection performance condition comprises:
determining a size of valid data stored in a block, wherein the block is included in the first plurality of blocks.

4. The method of claim 2, further comprising:
responsive to determining that the size of data of the first plurality of blocks satisfies the garbage collection performance condition, allocating an unused block from the common pool to the first plurality of blocks.

5. The method of claim 2, further comprising:
responsive to determining that the size of data of the first plurality of blocks satisfies the garbage collection performance condition, performing a garbage collection operation on a first block of the first plurality of blocks allocated to a system data structure; and
allocating the first block to the second plurality of blocks.

6. The method of claim 2, further comprising:
responsive to determining that the size of data of the first plurality of blocks does not satisfy the garbage collection performance condition, determining whether a number of the first plurality of blocks satisfies a threshold value.

7. The method of claim 6, further comprising:
responsive to determining that the number of the first plurality of blocks satisfies the threshold value, allocating an unused block from the common pool to the first plurality of blocks without performing a garbage collection operation on the first plurality of blocks.

8. The method of claim 6, further comprising:
responsive to determining that the number of the first plurality of blocks does not satisfy the threshold value, allocating a second block from the second plurality of blocks to the first plurality of blocks.

9. A system comprising:
a memory device;
a processing device operatively coupled to the memory device, the processing device to perform operations comprising:
identifying, a common pool of blocks of the memory device, the common pool of blocks comprising a first plurality of blocks allocated to system data and a second plurality of blocks allocated to user data;
responsive to determining that the user data has been written to the second plurality of blocks within a threshold amount of time,
allocating the first block to the second plurality of blocks of the memory device, wherein the block is designated for the user data before the allocating and designated for the system data after the allocating; and
responsive to identifying, among the first plurality of blocks, an unused block,
reallocating the unused block from the first plurality of blocks to the second plurality of blocks, wherein the unused block is designated for the system data before the reallocating and designated for the user data after the reallocating.

10. The method of claim 9, wherein the processing device is to perform further operations comprising:
determining whether a size of data of the first plurality of blocks satisfies a garbage collection performance condition.

11. The method of claim 10, wherein determining whether the size of data of the first plurality of blocks satisfies the garbage collection performance condition comprises:
determining a size of valid data stored in a block, wherein the block is included in the first plurality of blocks.

12. The method of claim 10, wherein the processing device is to perform further operations comprising:
responsive to determining that the size of data of the first plurality of blocks satisfies the garbage collection performance condition, allocating an unused block from the common pool to the first plurality of blocks.

13. The method of claim 10, wherein the processing device is to perform further operations comprising:
responsive to determining that the size of data of the first plurality of blocks satisfies the garbage collection performance condition, performing a garbage collection operation on a second block of the first plurality of blocks allocated to a system data structure; and
allocating the second block to the second plurality of blocks.

14. The method of claim 10, wherein the processing device is to perform further operations comprising:
responsive to determining that the size of data of the first plurality of blocks does not satisfy the garbage collection performance condition, determining whether a number of the first plurality of blocks satisfies a threshold value.

15. The method of claim 14, further comprising:
responsive to determining that the number of the first plurality of blocks satisfies the threshold value, allocating an unused block from the common pool to the first plurality of blocks without performing a garbage collection operation on the first plurality of blocks.

16. The method of claim 14, further comprising:
responsive to determining that the number of the first plurality of blocks does not satisfy the threshold value, allocating a second block from the second plurality of blocks to the first plurality of blocks.

17. A non-transitory computer-readable storage medium comprising instructions that, when executed by a processing device, cause the processing device to perform operations comprising:
identifying a common pool of blocks of the memory device, the common pool of blocks comprising a first plurality of blocks allocated to system data and a second plurality of blocks allocated to user data;
responsive to determining that the user data has not been written to the second plurality of blocks within a threshold period of time, allocating a block from the second plurality of blocks to the first plurality of blocks of the memory device, wherein the block is designated for the user data before the allocating and designated for the system data after the allocating;
responsive to identifying, among the first plurality of blocks, an unused block,
reallocating the unused block from the first plurality of blocks to the second plurality of blocks, wherein the unused block is designated for the system data before the reallocating and designated for the user data after the reallocating.

18. The non-transitory computer-readable storage medium of claim 17, wherein the processing device is to perform further operations comprising:
- determining whether a size of data of the first plurality of blocks satisfies a garbage collection performance condition; and
- responsive to determining that the size of data of the first plurality of blocks satisfies the data management execution condition, allocating an unused block from the common pool to the first plurality of blocks.

19. The non-transitory computer-readable storage medium of claim 18, wherein determining whether the size of data of the first plurality of blocks satisfies the garbage collection performance condition comprises:
- determining a size of valid data stored in a block, wherein the block is included in the first plurality of blocks.

20. The non-transitory computer-readable storage medium of claim 18, wherein the processing device is to perform further operations comprising:
- responsive to determining that the size of data of the first plurality of blocks satisfies the garbage collection performance condition, performing a garbage collection operation on a first block of the first plurality of blocks allocated to a system data structure; and
- allocating the first block to the second plurality of blocks.

* * * * *